Oct. 23, 1945.    H. H. STYLL    2,387,308
LIGHT POLARIZING BODY
Filed Oct. 25, 1937
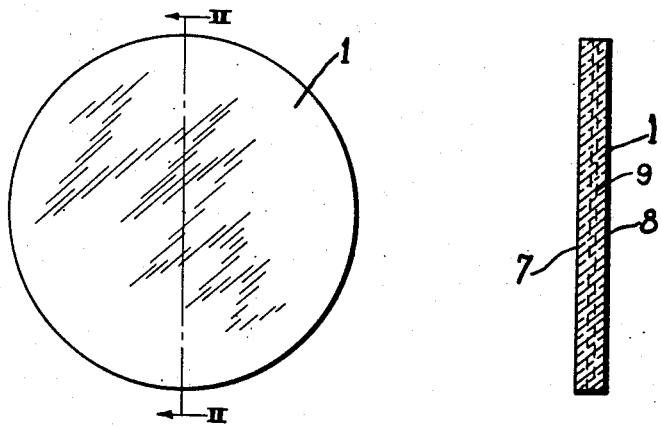
Fig. I    Fig. II
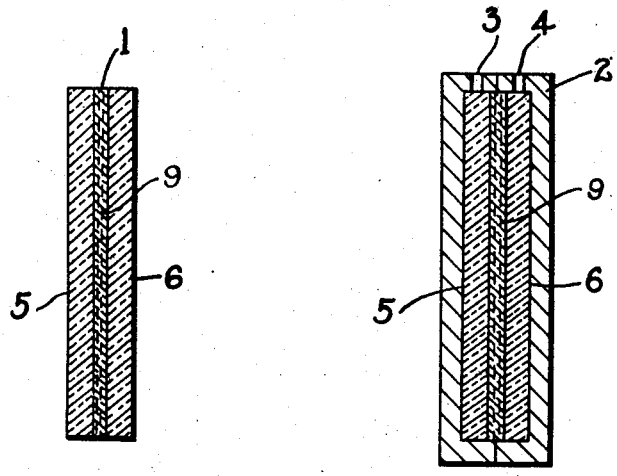
Fig. III    Fig. IV
INVENTOR
Harry H. Styll.

Patented Oct. 23, 1945

2,387,308

UNITED STATES PATENT OFFICE 2,387,308

LIGHT POLARIZING BODY

Harry H. Styll, Southbridge, Mass., assignor to American Optical Company, Southbridge, Mass., a voluntary association of Massachusetts Application October 25, 1937, Serial No. 170,897

2 Claims. (Cl. 88—65)

This invention relates to light-polarizing refracting bodies and particularly to such bodies made from matrices containing polarizing crystals.

One of the principal objects of the invention is to provide an improved light-polarizing body.

Another object of the invention is to provide new light-polarizing bodies containing oriented light-polarizing material.

Other objects and advantages of the invention will become apparent from the following description taken in connection with the accompanying drawing. It will be understood that many changes may be made in the details of construction without departing from the scope of the accompanying claims. I, therefore, do not wish to be limited to the exact details shown and described as the preferred forms only have been shown by way of illustration.

Referring to the drawing:

Fig. I is a front view of a lens embodying the invention;

Fig. II is a cross sectional view on line II—II of Fig. I;

Fig. III is a cross sectional view showing another form of the invention; and

Fig. IV is a cross sectional view showing a step in the process of making the form of invention shown in Fig. III.

In the past, light polarizing bodies have been manufactured by placing certain organic crystals in a composition such as cellulose acetate and orienting the crystals therein. The sheet or film of this material thus constructed was necessarily thin and fragile, due to the type of material and crystals used, as well as to the process, and it was, therefore, necessary to secure this thin film of light polarizing material between two sheets of glass for the practical use of such material. This necessarily made the use of this light polarizing material expensive and difficult to manufacture.

The crystals in the film of light polarizing material were readily destroyed by heat, fumes or moisture and as the film itself was made of cellulose acetate or similar organic material that also was readily destroyed by heat, fumes or moisture.

When the film was secured between sheets of glass, many difficulties were encountered due to the necessity of heat and pressure for securing the layers together and there was liability of injuring the film during the process of lamination, or if the working conditions were not just right there was danger of inadequate adhesion with resulting partial or complete separation of the component layers.

It, therefore, is the principal object of this invention to provide a light-polarizing material having light-polarizing crystals oriented therein and which is practical for commercial use without the necessity of securing the same between sheets of glass.

Referring more particularly to the drawing wherein similar reference characters designate corresponding parts throughout, as shown, the lens 1 embodying my invention comprises a plate or sheet of material, such as glass, having oriented therein light-polarizing crystals 9.

The lenses of the form shown in Fig. II are made by melting a quantity of glass in a container. I then place in the fluid glass a suitable quantity of minute inorganic crystals, such as tourmaline, epidote or other dichroic inorganic crystals, and then uniformly mix the crystals in the molten glass and allow the mass to partially cool. I then treat the material by stretching, or by other known processes, so that the polarizing axes of the embedded crystals will be substantially parallel and will thereby polarize light passing therethrough. Then the mass is allowed to finish cooling, the lens may then have its surfaces 7 and 8 shaped or ground to curvatures necessary to give desired refractive power in the finished lens.

By this process the light-polarizing body may be made in flat plates or sheets which may be cut up and fabricated in accordance with prior art lens manufacture and also in this process the crystals will be dispersed throughout the lens itself.

In making the form of lens shown in Figs. III and IV a thin lens 1 made as described above is supported in a mold 2 and fluid glass poured into the mold through the openings 3 and 4, and surrounds the lens 1 and allowed to harden after which the mold is opened and the lens blank removed, and curvatures of desired radii shaped or ground on the surfaces 5 and 6 of this blank to give the desired refractive power to the finished lens.

In this construction the layer containing the light-polarizing crystals and the two outer layers become united to form an integral lens.

In this process the crystals will be dispersed only throughout the central layer and will be protected from exposure by the outer layers of glass.

It will be understood that in the manufacture of this type of light-polarizing body it is necessary that inorganic crystals such as tourmaline, epidote and other similar synthetic crystals be used as they are not destroyed by the glass solution or by heat as would be the case with organic crystals.

The indices of refraction of the embedding matrix should approximate closely to the mean refractive index of the polarizing crystals. The size of the polarizing crystals should be in one direction at most the order of magnitude of the wavelength of sodium light and preferably less. The reciprocal relative dispersion of the suspending matrix may be controlled as desired so as to obtain desired optical characteristics in the finished product, for example, to make a composite lens, etc.

The coefficients of thermal expansion of the various components must be controlled in order to prevent breakage during the processes of fabrication of the lenses.

If desired, the glass employed in making these lenses may have ultra-violet and/or infra-red absorption properties.

In the case of glasses for absorbing the infra-red light rays such glasses have ferrous iron in their composition. Such a glass is the well known "Calobar" glass now on the market.

In the case of lenses having ultra-violet ray absorbing properties the glasses are those containing cerium, such as the well known "Cruxite" glass now on the market. Numerous other glasses for absorbing the ultra-violet light rays are listed in the "Bureau of Standards" publication such as the one issued March 19, 1920, Number 148, entitled "Technologic Papers of the Bureau of Standards," "The Ultra-Violet and Visible Transmission of Various Colored Glasses," giving glasses of this type. A later publication is circular #C421, June 1, 1938, and entitled "Spectral-Transmission Properties and Use of Colored Eye Protective Glasses."

It will be noted that the lens in its final form may be flat or non-curved as shown, curved, spheric, toric, cylindrical, aspherical, or any desired curvature, or they may be prismatic. Also they may be shaped or ground to any desired power. Also, the lenses may be molded to desired curvature by forming the surfaces of the mold to the curvatures necessary to give the desired power and by making the contact faces of the mold of polished Stellite or of other highly polished metal to give the surfaces of the lens good optical refractive properties.

Also, the lenses may be made of any desired color or, if desired, where the sheet of light polarizing material is placed in the mold, the glass surrounding the sheet or film may be of any desired color.

Either or both of the surfaces 7 or 8 may be tempered or hardened to make them resistant to blows or fractures by the usual prior art methods.

From the foregoing, it will be seen that I have provided articles capable of efficiently obtaining all of the objects and advantages of the invention in simple and inexpensive ways.

Having described my invention, I claim:

1. A self-supporting light-polarizer comprising transparent glass which has been stretched in heated condition, said glass having minute inorganic crystals selected from a group consisting of tourmaline and epidote crystals embedded therein and oriented by said stretching to cause said glass to be light-polarizing, with said minute inorganic crystals being capable of withstanding a temperature sufficiently elevated to permit stretching of said glass.

2. A self-supporting light-polarizer comprising transparent glass which has been stretched in heated condition, said glass having minute inorganic crystals selected from a group consisting of tourmaline and epidote crystals embedded therein and oriented by said stretching to cause said glass to be light-polarizing, with said minute inorganic crystals being capable of withstanding a temperature sufficiently elevated to permit stretching of said glass and being resistant to the fluxing action of the glass whereby said elements will not dissolve in the glass itself.

HARRY H. STYLL.